United States Patent [19]

Wang et al.

[11] Patent Number: 5,706,310
[45] Date of Patent: Jan. 6, 1998

[54] WIDE BANDWIDTH LOOP IN A FREQUENCY SHIFT KEYING (FSK) SYSTEM

[75] Inventors: Han-chiu Wang, Palo Alto; Eugene Hwan, San Carlos; Yen-fang Chao, Fremont, all of Calif.

[73] Assignee: Digital Microwave Corporation, San Jose, Calif.

[21] Appl. No.: 388,315

[22] Filed: Feb. 14, 1995

[51] Int. Cl.$^6$ .............................. H04K 1/02; H04L 75/03
[52] U.S. Cl. .......................... 375/296; 375/303; 455/84; 455/113
[58] Field of Search ................. 375/295, 296, 375/303, 307, 373, 375, 376; 331/1 A; 332/100–102; 327/2, 3, 5, 39, 50, 77, 141, 147, 156; 455/84–86, 113, 119, 126, 63

[56] References Cited

U.S. PATENT DOCUMENTS

| | | | |
|---|---|---|---|
| 3,212,023 | 10/1965 | Broadhead | 331/11 |
| 4,079,337 | 3/1978 | Lundgren et al. | |
| 4,554,517 | 11/1985 | Parniere et al. | 455/113 |
| 4,866,404 | 9/1989 | Vandegraff | 455/113 |
| 4,937,536 | 6/1990 | Reinhardt et al. | 331/84 |
| 5,155,454 | 10/1992 | Amoroso | 332/100 |
| 5,157,358 | 10/1992 | Benson | 332/100 |
| 5,241,566 | 8/1993 | Jackson | 375/62 |
| 5,309,479 | 5/1994 | Cheah | 375/62 |
| 5,323,125 | 6/1994 | Hiben | 332/100 |

*Primary Examiner*—Tesfaldet Bocure
*Assistant Examiner*—Bryan Webster
*Attorney, Agent, or Firm*—Skjerven, Morrill, MacPherson, Franklin & Friel; Edward C. Kwok

[57] ABSTRACT

A digital frequency shift keying (FSK) transmitter provides direct frequency modulation in a wide bandwidth loop. In one embodiment, a discriminator circuit recovers from the output signal of the transmitter a base band signal, which is then compared with the input base band signal to provide an error signal for controlling the output oscillator circuit. In another embodiment, the output oscillator is controlled by a phase detector detecting the phase difference between the base band modulating signal and the output signal of the transmitter. An additional narrow bandwidth loop can be added to compensate for frequency drift in the output oscillator due to temperature or other environmental changes.

10 Claims, 5 Drawing Sheets

WIDE BANDWIDTH LOOP IN A FREQUENCY SHIFT KEYING (FSK) SYSTEM

BACKGROUND OF THE INVENTION

1. Field of the Invention

This invention relates to radio transmission of digital signals; in particular, this invention relates to radio transmission of digital signals using frequency shift key (FSK) techniques.

2. Discussion of the Related Art

Because a large demand exists for telecommunication bandwidths, high frequency bands above 23 GHz (e.g. 38 Ghz) are increasingly being utilized. Many engineering problems, however, remain to be solved before economical operation at such high frequency bands can be achieved. For example, for spectrum efficiency reasons, current digital microwave radios use "quadrature amplitude modulation" (QAM), "quadrature phase shift keying" (QPSK) or "minimum shift keying" (MSK) modulation methods for encoding digital signals for transmission. However, each of these modulation methods requires a linear power amplifier, which is typically achieved by operating a power amplifier at a power level much lower than the amplifier's power rating. At higher frequency bands, such as 38 GHz, it is prohibitively expensive to provide such a linear power amplifier.

To circumvent the requirement of a linear amplifier, one possible modulation method which can be used at such high frequency bands is the "frequency shift keying" (FSK) modulation. FIG. 1 is a block diagram of a conventional FSK transmitter 100, using a "direct modulation" approach. As shown in FIG. 1, a base band signal 101 modulates the frequency of output signal 103 in a radio frequency voltage-controlled oscillator (RF VCO) 102 of a prescribed center frequency. Output signal 103 is transmitted by an amplifier in the RF VCO 102 at the amplifier's rated power level. To maintain frequency stability, a phase lock loop 120 is provided. Phase lock loop 120 performs a function commonly referred to as "automatic frequency control (AFC)." Phase lock loop 120 samples output signal 103 and mixes the sampled signal with reference frequency 104 to achieve a signal 109 of an intermediate frequency. Signal 109 is filtered in filter 105 and its phase is compared with the phase of reference signal 110. The phase difference between reference signal 110 and filtered signal 109 is then amplified to provide a corrective signal 109, which is used to center the frequency of RF VCO 102. The direct modulation approach, however, requires an unduly narrow AFC bandwidth (e.g. less than 100 Hz). Without such a narrow bandwidth, unacceptable signal distortion occurs in the signal spectrum of AFC loop. The primary areas of concern for a designer of a direct modulation system are: (i) maintaining stability of frequency, (ii) minimizing susceptibility to microphonics[1], (iii) minimizing effects of frequency jitters[2] in the system, and (iv) improving the phase noise[3] performance of the system. A wide bandwidth loop is necessary to be effective in suppressing microphonics, minimizing the effects of frequency jitters on the system, and improving phase noise performance of the system.

[1] Microphonics are changes in performance characteristics of an electrical element due to a mechanical force. For example, microphonics affect a radio transmission system during a hail storm, or even from the vibrations of a passing train.
[2] Frequency jitters are inherent output frequency variations in all voltage-controlled oscillators.
[3] Every voltage-controlled oscillator (VCO) has a monotonously decreasing concave phase noise curve, i.e. phase noise, which is measured in decibels, decreases as the difference between the frequency of the oscillator and the carrier frequency increases. Typically, as part of the specification, an engineer specifies for the VCO a minimum phase noise performance at a given frequency.

FIGS. 2a and 2b provide two other approaches of providing FSK modulation which do not require an unduly narrow AFC bandwidth. FIG. 2a is a block diagram of a digital radio transmitter 210 under the first of the two approaches. In FIG. 2a, modulator 202 modulates a baseband signal 201 to provide a modulated signal 203, which is amplified and up-converted in up-converter 205 by reference frequency 204 generated by local oscillator 212. Output signal 209 of up-converter 205 is then filtered and amplified by power amplifier 207 to be transmitted as output signal 208. In FIG. 2a, frequency stability in local oscillator 212 is provided by a phase lock loop 211, which operates independently of baseband signal 201.

FIG. 2b is a block diagram of a digital radio transmitter 220 using a conventional FSK modulation method similar to that shown in FIG. 2a. To facilitate comparison, like elements in FIGS. 2a and 2b are provided like reference numerals. In FIG. 2b, the final output frequency is obtained by frequency multiplier 213. The output signal of frequency multiplier 213 is then filtered in filter 214 and amplified in amplifier 207 and transmitted as output signal 208.

Although the approaches in FIGS. 2a and 2b does not require a narrow bandwidth in the AFC loop, the digital radio transmitters 210 and 220 of FIGS. 2a and 2b are relatively much more expensive to implement than the direct modulation approach shown in FIG. 1. Thus, it is desirable to have a digital radio transmitter which does not require a narrow bandwidth using the direct modulation approach.

SUMMARY OF THE INVENTION

In accordance with the present invention, an FSK transmitter and a method are provided. The FSK transmitter includes a wide band feedback loop which operates free of frequency jitters, susceptibility to microphonics, and phase noises of the output oscillator. An additional narrow band feedback loop can be provided in accordance with the present invention to prevent a drift in the output oscillator's operational frequency.

In one embodiment, the wide bandwidth feedback loop includes: a) a mixer obtaining from the output signal of a transmitter a signal of a predetermined intermediate frequency; b) a discriminator, which derives from the signal of the predetermined intermediate frequency a recovered base band signal; and c) a comparator for providing an error signal based on a signal difference between the recovered base band signal and the modulated base band signal.

In a second embodiment of the present invention, the wide bandwidth feedback loop includes: a) a mixer obtaining from the output signal of a transmitter a first signal of a predetermined intermediate frequency; b) a modulator for modulating the modulated base band signal to a second signal of the same predetermined intermediate frequency; and c) a phase detector detecting a phase difference between the first signal and the second signal to providing an error signal for controlling the output oscillator in accordance with the detected phase difference.

The present invention preserves the simple implementation of a direct modulation scheme and at the same time provides a wide bandwidth modulation operation, without requiring a linear amplifier.

The present invention is better understood upon consideration of the following detailed description and the accompanying drawings.

BRIEF DESCRIPTION OF THE DRAWINGS

FIG. 4a is a block diagram of a digital FSK transmitter 400, which includes an additional narrow bandwidth loop for improving DC performance of digital FSK transmitter 300 of FIG. 3a.

FIG. 4b is a block diagram of a digital FSK transmitter 450, which includes an additional narrow bandwidth loop for improving DC performance of digital FSK transmitter 350 of FIG. 3a.

DETAILED DESCRIPTION OF THE PREFERRED EMBODIMENTS

The present invention provides a digital radio transmitter with a wide bandwidth using a direct modulation approach.

Figure 3A:
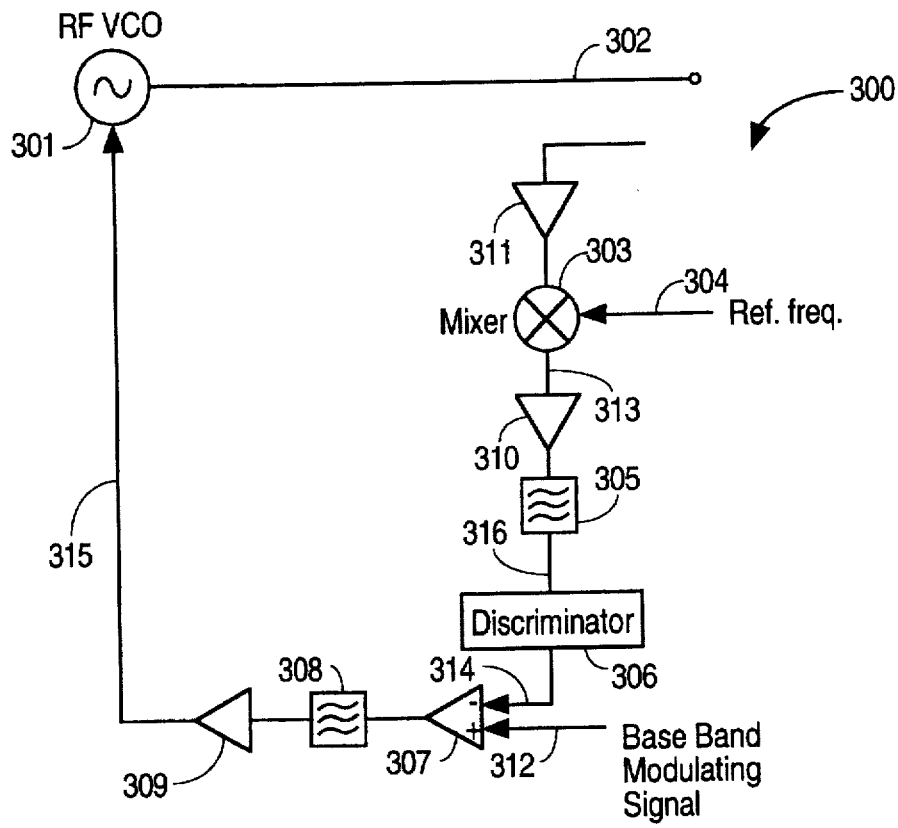
FIG. 3a is a block diagram of a digital FSK transmitter 300, in accordance with the present invention.

The basic principles of the present invention are illustrated with reference to FIGS. 3a and 3b. FIG. 3a is a block diagram of a digital FSK transmitter 300 using a direct modulation approach. As shown in FIG. 3a, very high frequency (e.g. 38 GHz) radio frequency voltage-controlled oscillator (RF VCO) 301 provides output signal 302, which is modulated in accordance with the present invention. Output signal 302 is sampled by amplifier 311 and mixed in mixer 303 with signal 304 of a reference frequency to provide output signal 313, which is a signal of a predetermined intermediate frequency, e.g. 1.0 GHz. Output signal 313 is amplified in amplifier 310 and filtered in filter 305 to become output signal 316, which is fed into discriminator 306. The output signal of discriminator 306 is a recovered baseband modulating signal, shown in FIG. 3a as signal 314. Comparator 307 compares recovered baseband modulating signal 314 with incoming baseband modulating signal 312 to provide an error signal 315, after filtering (filter 308) and amplification (amplifier 369). Error signal 315 controls the output frequency of RF VCO 301. Because the feedback path in FIG. 3a provides an error signal based on the output signal of a frequency discriminator, transmitter 300 of FIG. 3a is controlled by a frequency control loop.

Figure 3B:
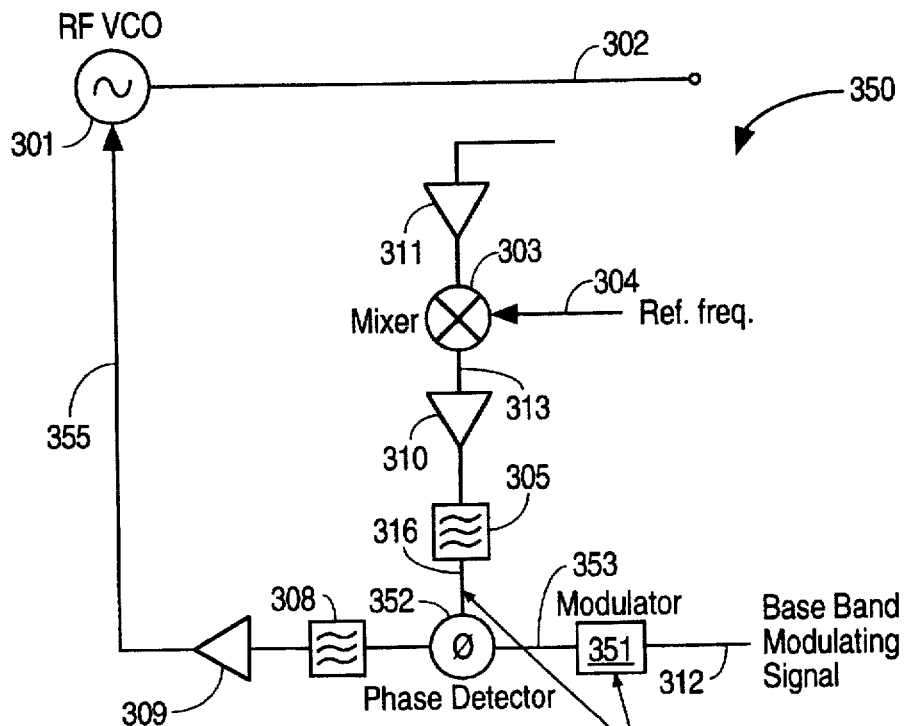
FIG. 3b is a block diagram of a digital FSK transmitter 350, in accordance with the present invention.

FIG. 3b shows an alternative embodiment of the present invention using a phase control loop, rather than a frequency control loop. To facilitate comparison between figures hereinbelow, i.e. in FIGS. 3a and 3b and in all other subsequent figures, like elements are given like reference numerals. As shown in FIG. 3a, output signal 313 of FIG. 3b has a predetermined intermediate frequency of 1 GHz. In FIG. 3b, baseband modulating signal 312 is modulated to the predetermined intermediate frequency 1 GHz by modulator 351 to provide modulated output signal 353. Phase detector 352 compares the modulated output signal 353 and provides, after filtering (filter 308) and amplification (amplifier 309) error signal 355, which controls the phase of output signal 302.

Figure 1:
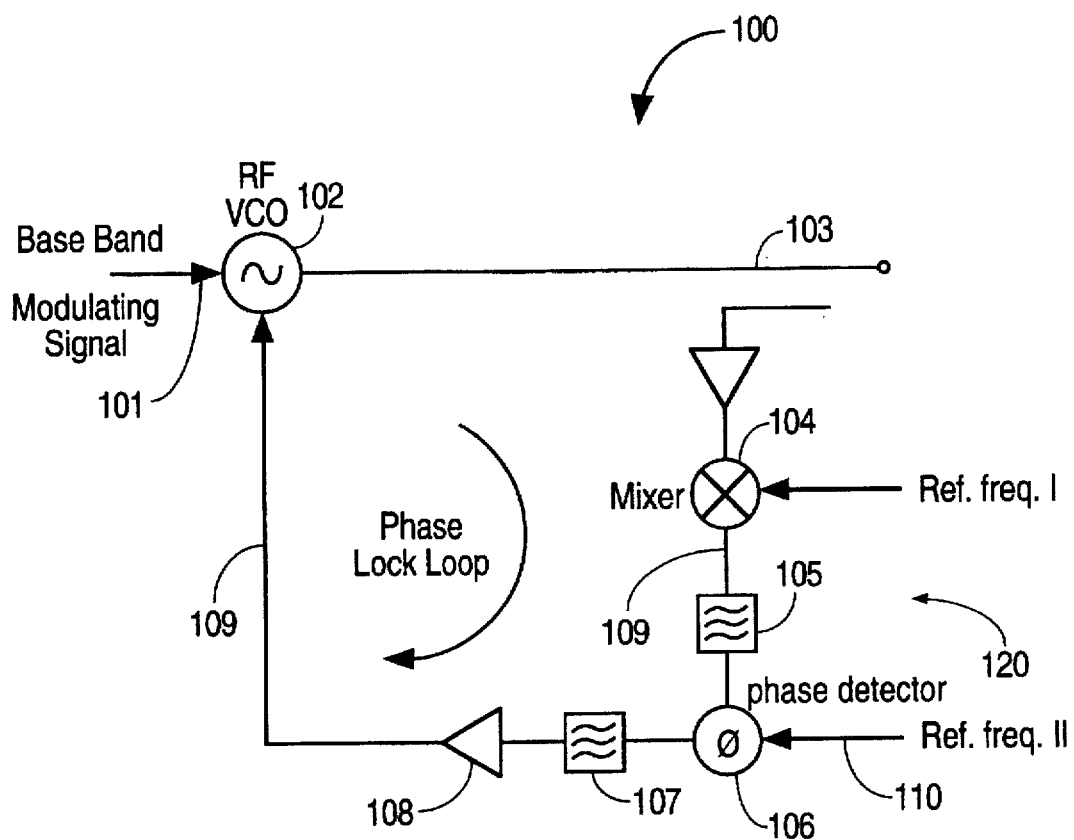
FIG. 1 is a block diagram of a conventional FSK transmitter 100, using a "direct modulation" approach.
Figure 2A:
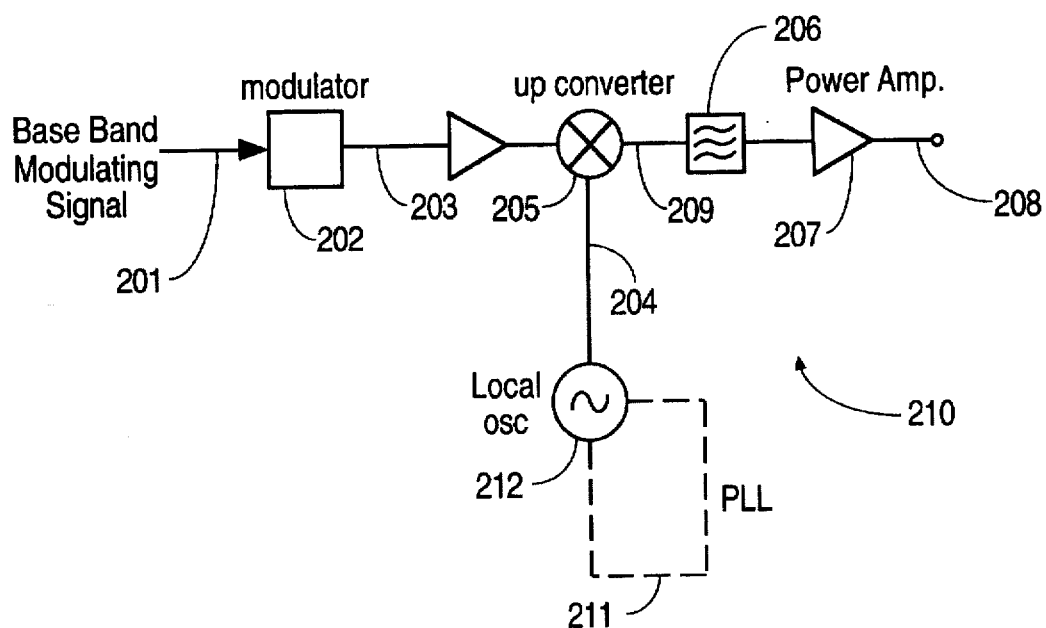
FIG. 2a is a block diagram of a conventional FSK transmitter 210 not requiring a narrow AFC loop bandwidth.
Figure 2B:
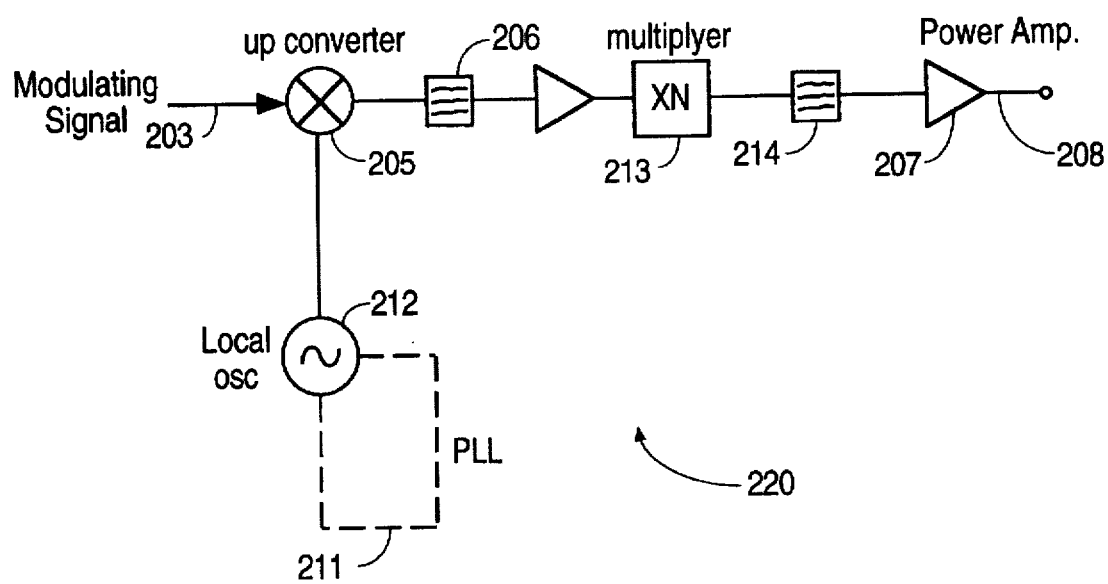
FIG. 2b is a block diagram of a conventional FSK transmitter 220 not requiring a narrow AFC loop bandwidth.

As compared to a conventional direct modulation transmitter, such as transmitter 100 shown in FIG. 1, the frequency control loop of digital FSK transmitter 300 and the phase control loop of digital FSK transmitter 350 each have a wide band width. This wide bandwidth, at the minimum, can equal the highest frequency of the baseband modulating signal, i.e. this wide bandwidth can be in the megahertz range. Consequently, microphonics and frequency jitters are suppressed effectively in digital FSK transmitter 300. FSK transmitter 300 has such immunity to microphonics, it is unlikely that any natural phenomenon would induce sufficient large microphonics to disrupt FSK transmitter 300's operation. In addition, the wide band width of FSK transmitter 300 allows the use of even poor frequency jitter VCO's to reduce the total system costs. Further, the wide band width loop improves the phase noise performance of many VCO's. In fact, in the embodiment of the present invention described below with respect to FIG. 5, the system phase noise requirement for −83 dB performance at 100 KHz can be met by many VCO's having a specification performance of only −70 db at 100 KHz due to phase noise performance improvement of the wide bandwidth loop.

It is well known that free running oscillators suffer from drifts in operational frequencies over time as a result of aging or changes in operational temperatures. However, because of the high open-loop gains in the frequency control loop of digital FSK transmitter 300 and in the phase control loop of digital FSK transmitter 350, neither control loop is capable of controlling such a drift in frequency. Such a drift in frequency is corrected by imposing an appropriate DC bias at RF VCO 301. To generate such a DC bias to compensate for the systematic frequency drift, the present invention provides an additional narrow bandwidth loop for such a digital FSK transmitter. The narrow bandwidth loop is illustrated for digital FSK transmitters 400 and 450 in FIGS. 4a and 4b respectively.

Figure 4A:
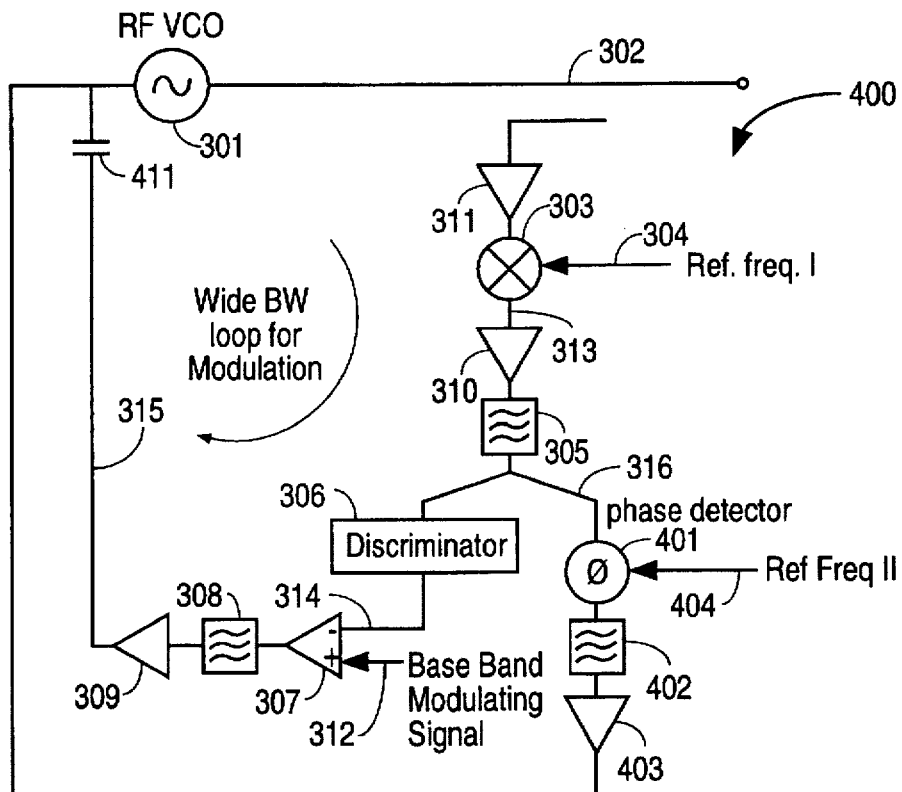

As shown in FIG. 4a, signal 316 is not only an input signal to discriminator 306, but also an input signal into phase detector 401. Phase detector 401 compares the phase of signal 316 with reference signal 404. The difference in phase between signal 316 and reference signal 404 is provided as error signal 405, after filtering and amplification in filter 402 and amplifier 403, to correct any phase error. As discussed with respect to FIG. 1 above, the loop including phase detector 401 is a loop with a very narrow bandwidth. Thus, such a loop is suited for compensating for a systematic drift in frequency of RF VCO 301. Blocking capacitor 411 ensures that no DC bias voltage is imposed on RF VCO 301 by the wide bandwidth frequency control loop.

Figure 4B:
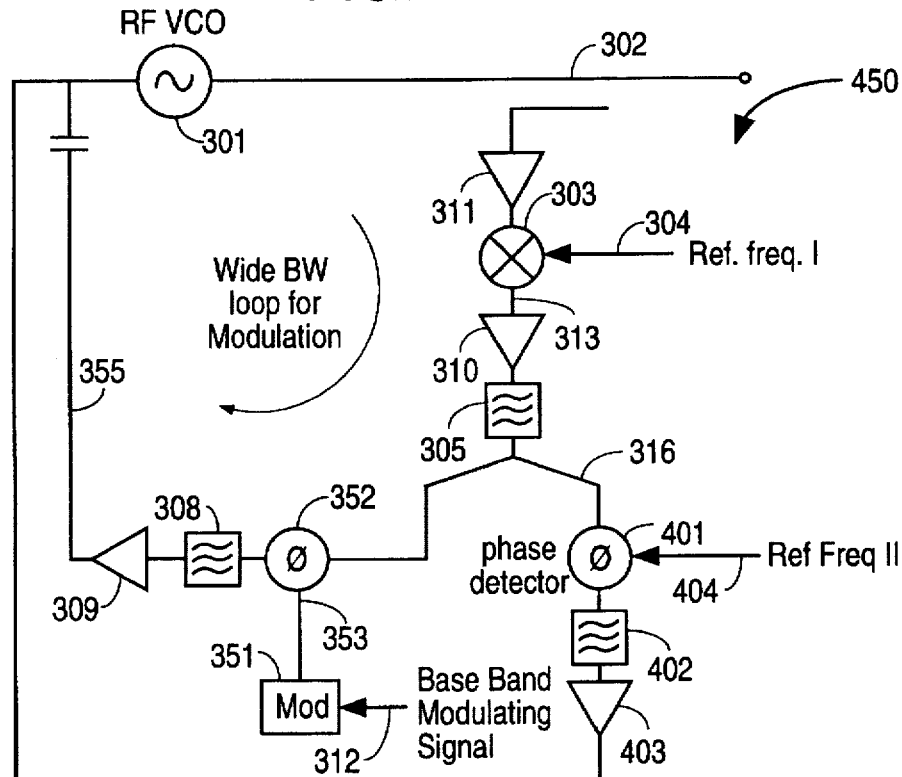

FIG. 4b is a block diagram of a digital FSK transmitter 450, which includes an additional narrow bandwidth loop for improving DC performance of digital FSK transmitter 350 of FIG. 3a. Digital FSK transmitter 450 operates in a similar manner as digital FSK transmitter 400 described above.

Figure 5:
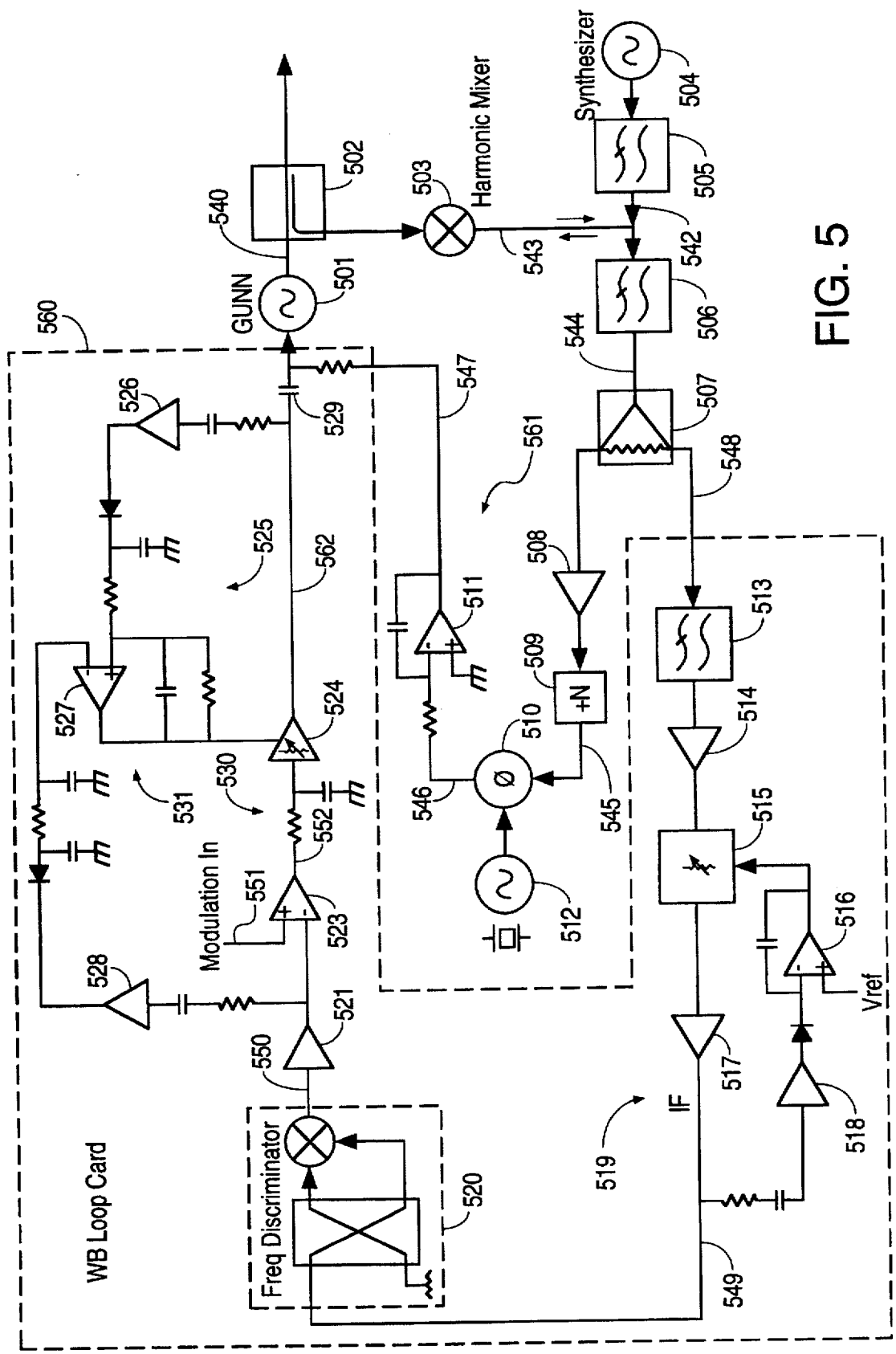
FIG. 5 shows an embodiment 500 of the present invention using readily available off-the-shelf components.

FIG. 5 shows an embodiment 500 of the present invention, using readily available off-the-shelf components. As shown in FIG. 5, a 38 GHz Gunn Oscillator 501 provides output signal 540 to be transmitted. Output signal 540 is coupled by coupler 502 as an input signal 541 into harmonic mixer 503. Harmonic mixer 503 receives a 4 GHz input signal 542. Input signal 542 results from band-pass filtering (filter 505) the output signal of 4 GHz synthesizer 504.

Output signal 543 of harmonic mixer 503 is filtered by bandpass filter 506 to provide signal 544, which is approximately 1.3 GHz. The 1.3 GHz output signal of harmonic mixer 503 is achieved by the product of oscillator 501's 38

GHz frequency and twelve times synthesizer 504's 4 GHz frequency. Signal splitter 507 feeds signal 544 into two signal paths. The first signal path is narrow band width loop 561 for correction of frequency drift in Gunn oscillator 501. Narrow band width loop 561 includes amplifier 508, frequency divider 509, phase detector 510 and integrator 511. A portion of signal 544 is amplified by amplifier 508 and its frequency divided by 13 in frequency divider 509, to provide 100 MHz signal 545. Signal 545 is compared in phase detector 510 with an 100 MHz output signal of crystal oscillator 512. Phase detector 510 provides error signal 546, which is low-pass filtered by integrator 510 to provide a corrective bias voltage to compensate for any drift in frequency in Gunn oscillator 501.

Splitter 507 also provides a portion of signal 544 as signal 548 to the wide bandwidth loop (loop 560) of the present invention shown in FIG. 5. Signal 548 is once again bandpass filtered at 1.3 GHz by filter 513, amplified RF amplifier 514, and attenuated by attenuator circuit 519 to provide signal 549 as an input signal to discriminator 520. Attenuator circuit 519, which includes variable PIN attenuator 515, radio frequency (RF) amplifier 517, RF amplifier 518 and operational amplifier 516, is part of an automatic level control circuit (ALC) for maintaining a constant level output signal level to discriminator 520, regardless of any variation in input power. In this embodiment, discriminator 520 includes a 90-degree phase shifter and a mixer. Output signal 550 of discriminator 520 is a baseband signal of 10 MHz. Output signal 550 is amplified by base band amplifier 521 and provided to the inverting input terminal of base band amplifier 523. The amplified signal difference between output signal 550 and input modulation signal 551, which is provided to the provides error signal 552. Error signal 552 is then low-pass filtered in loop filter 530 and attenuated by base band attenuator 524. Loop filter 530 has a 3 dB bandwidth at 1.2 MHz. Output signal 562 of base band attenuator 524 is provided as the wide bandwidth loop output signal to Gunn oscillator 501. Blocking capacitor 529 eliminates any DC components in output signal 562. The variable gain of base band attenuator 524 is controlled by modulation sensitivity circuit 531, which compensates for loop gain variation caused by changes in the modulation in Gunn oscillator 501. In the present embodiment, Gunn oscillator 501 has a modulation sensitivity which can vary between 25 Mhz per volt to 45 MHz per volt. Modulation sensitivity circuit 531 includes base band amplifier 526 and operational amplifier 527. Operational amplifier 527 receives, at its inverting input terminal, the filtered output signal of base band amplifier 528 and, at its non-inverting input terminal, the filtered signal of base band amplifier 526. Base band amplifier 528 receives as input signal the amplified output signal of frequency discriminator 520. Base band amplifier 526 receives as input signal the output signal of base band attenuator 524.

Off-the-shelf components are readily available for implementing the present invention. For example, the following components known to those skilled in the art can be used to implement the embodiment shown in FIG. 5:

| | |
|---|---|
| RF amplifier 514 | INA-03186 |
| PIN attenuator 515 | HP 5082-3880 |
| Operational amp. 516 | LM358 |
| RF amplifier 517 | INA-03186 |
| RF amplifier 518 | INA-03186 |
| Freq. discriminator 520 | HP 5082-2831 |
| Base band amplifier 521 | CLC425 |

-continued

| | |
|---|---|
| Base band amplifier 523 | CLC425 |
| Base band attenuator 524 | J111 |
| Base band amplifier 526 | HPMA-0285 |
| Operational amp. 527 | LM358 |
| Base band amplifier 528 | HPMA-0285 |

The above detailed description is provided to illustrate the specific embodiments of the present invention, and is not intended to be limiting. Variations and modifications within the scope of the present invention are possible. The present invention is defined by the accompanying drawings.

I claim:

1. A transmitter for transmitting a modulated base band signal, said transmitter comprising:

an output oscillator controlled by an error signal and providing an output signal;

a wide band width feedback loop, coupled to receive said output signal and said modulated base band signal, for providing said error signal in accordance with a phase or frequency difference derived from said output signal and said modulated base band signal; and a narrow band width loop, said narrow band width loop receiving said output signal and a reference signal of a predetermined reference frequency to provide a DC correction signal to correct for a systematic drift in said output oscillator in accordance with a frequency or phase difference between said output signal and said reference signal.

2. A transmitter for transmitting a modulated base band signal, said transmitter comprising:

an output oscillator controlled by an error signal and providing an output signal; and a wide band width feedback loop, coupled to receive said output signal and said modulated base band signal, for providing said error signal in accordance with a phase or frequency difference derived from said output signal and said modulated base band signal;

wherein said wide band width feedback loop comprises:
    a mixer reducing said output signal to a signal of a predetermined intermediate frequency;
    a discriminator, receiving said signal of a predetermined intermediate frequency, to provide a recovered base band signal; and
    a comparator for providing an error signal based on a signal difference between said recovered base band signal and said modulated base band signal.

3. A transmitter as in claim 2, wherein said mixer comprises a harmonic mixer.

4. A transmitter as in claim 2, wherein said wide band width loop further comprises an attenuator circuit for attenuating said signal of a predetermined intermediate frequency to a suitable voltage level for input to said discriminator.

5. A transmitter for transmitting a modulated base band signal, said transmitter comprising:

an output oscillator controlled by an error signal and providing an output signal; and a wide band width feedback loop, coupled to receive said output signal and said modulated base band signal, for providing said error signal in accordance with a phase or frequency difference derived from said output signal and said modulated base band signal;

wherein said wide band width feedback loop comprises:
    a mixer reducing said output signal to a first signal of a predetermined intermediate frequency;

a modulator for modulating said modulated base band signal to a second signal of said predetermined intermediate frequency; and a phase detector detecting a phase difference between said first signal and said second signal and providing said error signal in accordance with said phase difference.

6. A method for transmitting a modulated base band signal, said method comprising the steps of:

using an output oscillator to provide an output signal;

providing a wide band width feedback loop, coupled to receive said output signal and said modulated base band signal, to providing an error signal to drive said output oscillator in accordance with a phase or frequency difference derived from said output signal and said modulated base band signal; and providing a narrow band width loop, said narrow band width loop receiving said output signal and a reference signal of a predetermined reference frequency to provide a DC correction signal to correct for a systematic drift in said output oscillator in accordance with a frequency or phase difference between said output signal and said reference signal.

7. A method for transmitting a modulated base band signal, said method comprising the steps of:

using an output oscillator to provide an output signal; and providing a wide band width feedback loop, coupled to receive said output signal and said modulated base band signal, to providing an error signal to drive said output oscillator in accordance with a phase or frequency difference derived from said output signal and said modulated base band signal;

wherein step of providing a wide band width feedback loop comprises the steps of:

reducing said output signal to a signal of a predetermined intermediate frequency;

receiving said signal of a predetermined intermediate frequency in a discriminator to provide a recovered base band signal; and providing an error signal based on a signal difference between said recovered base band signal and said modulated base band signal.

8. A method as in claim 7, wherein said step of reducing comprises the step of feeding said output signal into a harmonic mixer to be mixed with a signal of said predetermined intermediate frequency.

9. A method in claim 7, wherein said step of providing a wide band width loop further comprises the step of providing an attenuator circuit for attenuating said signal of a predetermined intermediate frequency to a suitable voltage level for input to said discriminator.

10. A method for transmitting a modulated base band signal, said method comprising the steps of:

using an output oscillator to provide an output signal; and providing a wide band width feedback loop, coupled to receive said output signal and said modulated base band signal, to providing an error signal to drive said output oscillator in accordance with a phase or frequency difference derived from said output signal and said modulated base band signal;

wherein said step of providing a wide band width feedback loop comprises:

mixing said output signal with a reference signal to obtain a first signal of a predetermined intermediate frequency;

modulating said modulated base band signal to obtain a second signal of said predetermined intermediate frequency; and detecting a phase difference between said first signal and said second signal and providing said error signal in accordance with said phase difference.

* * * * *